United States Patent
Im

(10) Patent No.: US 6,738,688 B2
(45) Date of Patent: May 18, 2004

(54) METHOD OF PREDICTING CARRYING TIME IN AUTOMATIC WAREHOUSE SYSTEM

(75) Inventor: Kwang-Young Im, Anyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/385,528

(22) Filed: Mar. 12, 2003

(65) Prior Publication Data

US 2003/0225554 A1 Dec. 4, 2003

(30) Foreign Application Priority Data

Jun. 3, 2002 (KR) .......................................... 2002-31109

(51) Int. Cl.$^7$ ................................................. G06F 7/00
(52) U.S. Cl. ......................................... 700/214; 700/48
(58) Field of Search ................................. 700/213, 214, 700/228, 245, 255, 28, 29, 30, 31, 33, 48

(56) References Cited

U.S. PATENT DOCUMENTS

| | | | | | |
|---|---|---|---|---|---|
| 5,175,690 A | * | 12/1992 | Berthier et al. | ............. | 700/214 |
| 5,202,832 A | * | 4/1993 | Lisy | ............................ | 701/24 |
| 5,477,444 A | * | 12/1995 | Bhat et al. | ..................... | 700/48 |
| 5,596,502 A | * | 1/1997 | Koski et al. | .................. | 700/95 |
| 5,659,667 A | * | 8/1997 | Buescher et al. | ............. | 706/23 |
| 5,864,693 A | | 1/1999 | Sawamura | | |
| 6,078,946 A | * | 6/2000 | Johnson | ...................... | 709/200 |
| 6,484,092 B2 | * | 11/2002 | Seibel | ........................ | 701/209 |

\* cited by examiner

Primary Examiner—Khoi H. Tran
(74) Attorney, Agent, or Firm—Staas & Halsey LLP

(57) ABSTRACT

A method of predicting a carrying time in an automatic warehouse system. Input variables of a real automatic warehouse system are set in a virtual automatic warehouse system. The virtual automatic warehouse system is modeled based upon the set input variables. An optimal weighting value is set according to the modeling. A predicted carrying time is calculated based upon data input corresponding to the set variables and past history data related to a moving time(s) in the automatic warehouse system. An error between the predicted carrying time and a real carrying time in the automatic warehouse system is calculated. An optimal carrying path in the automatic warehouse system is selected according to the predicted carrying time if the error is within a preset allowable range.

6 Claims, 3 Drawing Sheets

METHOD OF PREDICTING CARRYING TIME IN AUTOMATIC WAREHOUSE SYSTEM

CROSS-REFERENCE TO RELATED APPLICATIONS

This application claims the benefit of Korean Application No. 2002-31109 filed Jun. 3, 2002, in the Korean Industrial Property Office, the disclosure of which is incorporated herein by reference.

BACKGROUND OF THE INVENTION

1. Field of the Invention

The present invention relates generally to control of a logistics system, and more particularly to a method of predicting a carrying time in an automatic warehouse system which functions as a buffer in a logistics system.

2. Description of the Related Art

FIG. 1 is a block diagram of a logistics control system of a typical semiconductor production line. As shown in FIG. 1, a production control system 102 receives process data from a semiconductor production line 108, generates carrying commands for parts required for a current process or carrying commands for products having completed a process and transmits the carrying commands to a logistics control system 104. The logistics control system 104 transmits a control command to an automatic warehouse system 106, such that a carrying operation can be performed between the semiconductor production line 108 and the automatic warehouse system 106. The control commands can comprise factors that influence a carrying time, such as a carrying type, operation priority, etc. In this case, logistics data are provided from the automatic warehouse system 106 to the logistics control system 104.

In industry fields such as a semiconductor manufacturing process, logistics control, which is used to provide parts required by a production line or to carry and load processed products in the production line, is a very important part in shortening a production period. That is, if a time required for a carrying operation is shortened by selecting a carrying path requiring a shortest carrying time, an entire production period of a product can be shortened. Therefore, it is desirable to shorten production periods of products so as to reduce production costs of products.

SUMMARY OF THE INVENTION

Accordingly, the present invention has been made keeping in mind at least the above problems occurring in the related art, and the present invention provides a method of predicting a carrying time in an automatic warehouse system using a neural network, which calculates a predicted (i.e., an optimal) moving (carrying) coefficient (i.e., a virtual moving coefficient) by modeling an automatic warehouse system using a neural networks theory, and selects an optimal carrying path for a carrying command of a production control system by applying the predicted moving coefficient to a real logistics control system.

Additional aspects and advantages of the invention will be set forth in part in the description which follows and, in part, will be obvious from the description, or may be learned by practice of the invention.

The present invention may be achieved by a method of controlling an automatic warehouse system in a logistics system, comprising setting input variables of the automatic warehouse system to a virtual automatic warehouse system modeling the automatic warehouse system based upon the input variables; setting an optimal weighting value according to the modeling; calculating a predicted carrying time based upon the optimal weighting value, input data corresponding to the input variables and past history data related to a moving time(s) in the automatic warehouse system; calculating an error between the predicted carrying time and a real carrying time in the automatic warehouse system; and selecting an optimal carrying path in the automatic warehouse system according to the predicted carrying time if the error is within a preset allowable range.

BRIEF DESCRIPTION OF THE DRAWINGS

The above and other aspects, features and other advantages of the present invention will be more clearly understood from the following detailed description of the preferred embodiments taken in conjunction with the accompanying drawings, in which.

DETAILED DESCRIPTION OF THE PREFERRED EMBODIMENTS

Figure 1:
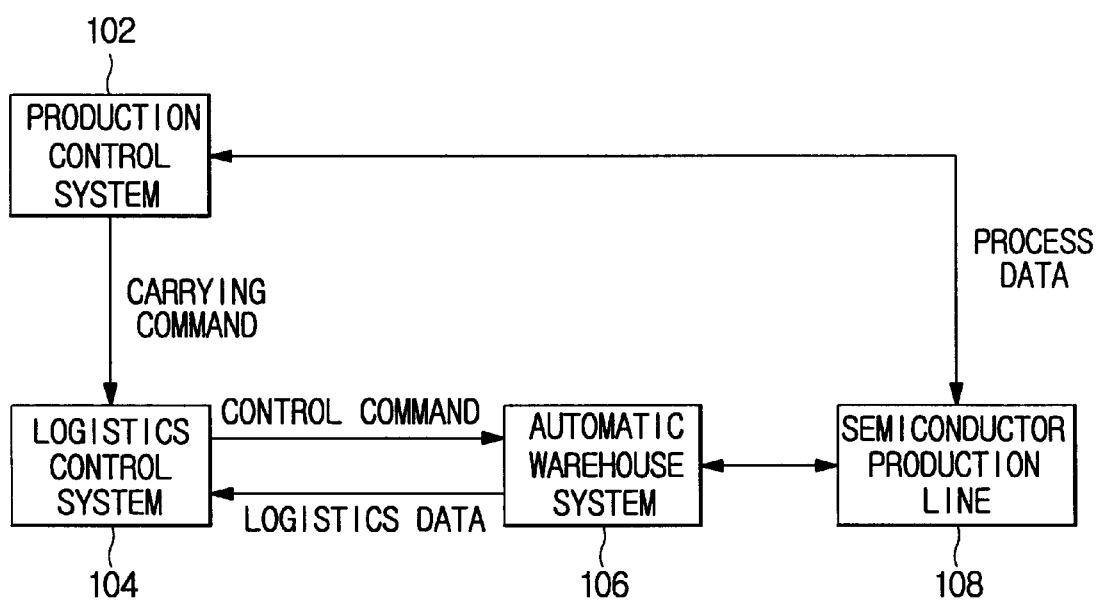
FIG. 1 is a block diagram of a logistics control system of a typical semiconductor production line.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures. A method of predicting a carrying time in an automatic warehouse system using a neural networks theory according to an embodiment the present invention will be described in detail with reference to FIGS. 2 to 3.

Figure 2:
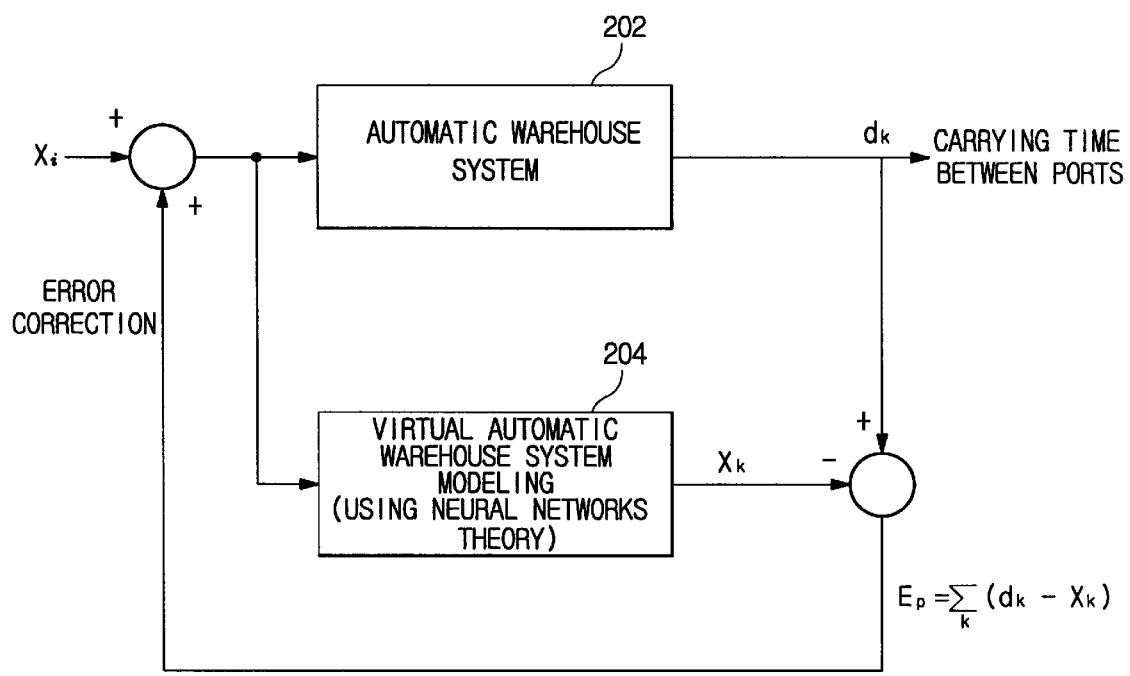
FIG. 2 is a block diagram showing a control concept of an automatic warehouse system using a neural networks theory according to an embodiment of the present invention.

FIG. 2 is a block diagram showing a control concept of an automatic warehouse system using a neural networks theory according to an embodiment the present invention. As shown in FIG. 2, when input variables $X_i$ are input to an automatic warehouse system 202 (for example, from logistics control systems 102, 104, such that the control commands can comprise one or more of the $X_i$ variables, etc.), the automatic warehouse system 202 outputs a real carrying time $d_k$ required between ports based on the input variables. The variables input (from any data source) to the automatic warehouse system 202 are factors influencing a carrying time, for example, a number of operations in standby, usable capacity, a number of stacker cranes, a distance between carrying ports, a carrying type, an operation priority, etc.

A virtual automatic warehouse system 204 receives the same variables $X_i$ as the real automatic warehouse system 202, and generates a virtual moving coefficient $X_k$. An error $E_p$ between the real carrying time $d_k$ output from the real automatic warehouse system 202 and a carrying time based on the virtual moving coefficient $X_k$ output from the virtual automatic warehouse system 204 is fed back to an input stage of the input variables $X_i$ to correct errors and/or adjust in the input variables $X_i$. The automatic warehouse system 202 performs a carrying operation based upon the corrected input variables $X_i$. Typically, the error $E_p$ is calculated using the following equation 1. In equation 1, k is an index of output variable data (i.e., if the number of output variable data is 3, then k=1, 2, 3.

Equation 1:

$$E_p = \sum_k (d_k - X_k)$$

Figure 3:
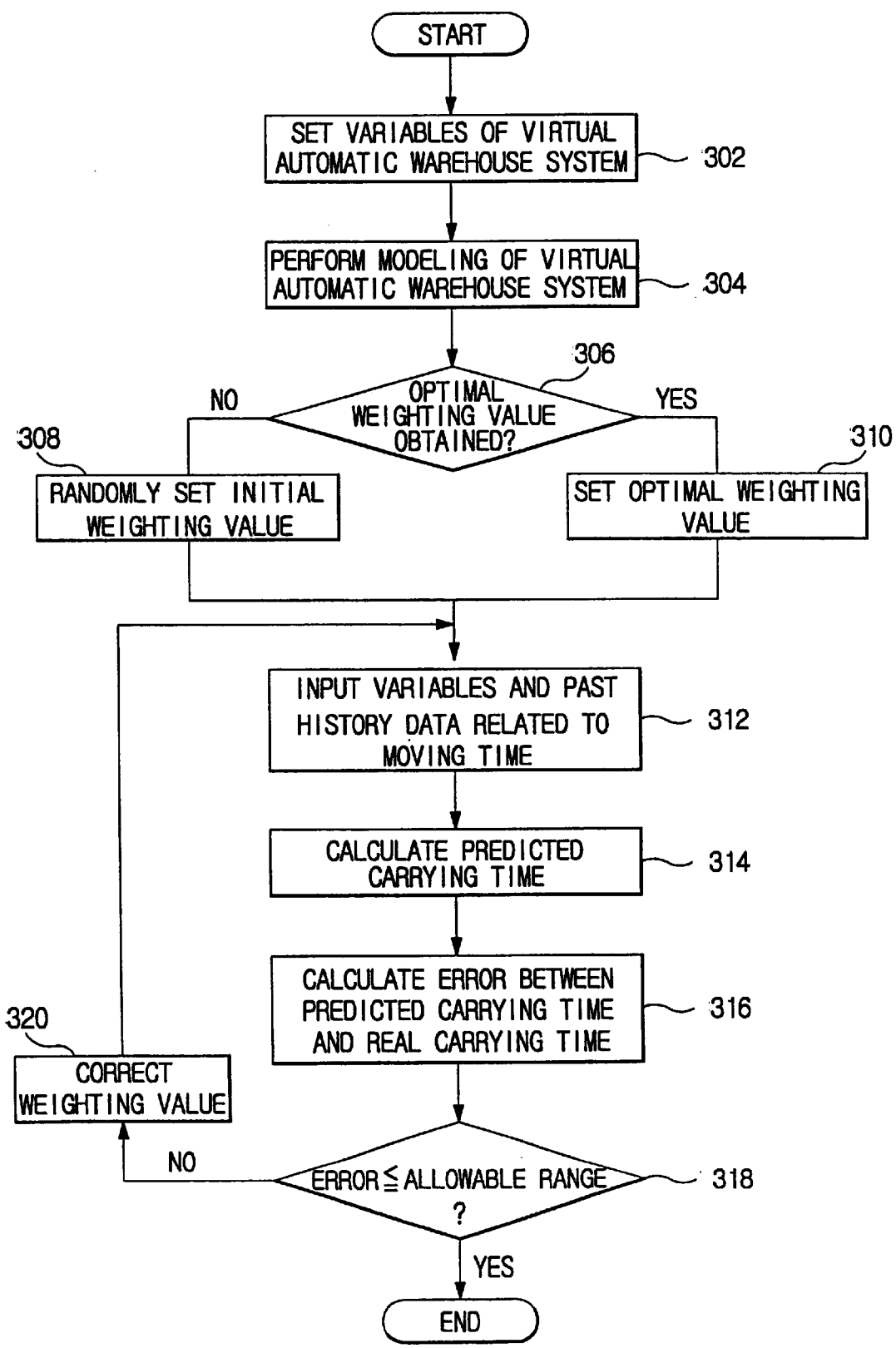
FIG. 3 is a flowchart of a learning method of a virtual automatic warehouse system using a neural networks theory according to an embodiment of the present invention.

FIG. 3 is a flowchart of a learning method of the virtual automatic warehouse system 204 using a neural networks theory according to an embodiment of the present invention. As shown in FIG. 3, at operation 302, input variables $X_i$ input to a real automatic warehouse system 202 are set in the virtual automatic warehouse system 204. In this case, the set variables are variables influencing a carrying time, such as the number of operations in standby, the usable capacity, the number of stacker cranes, the distance between carrying ports, the carrying type, the operation priority, etc. When the input variables $X_i$ are set, at operation 304, the virtual automatic warehouse system 204 models the real automatic warehouse system 202 by applying a neural networks theory to the variables $X_i$.

When, at operation 304, the modeling of by the virtual automatic warehouse system 204 has been completed, at operation 306 it is determined whether an optimal weighting value is obtained. If the optimal weighting value is not obtained, at operation 308 an initial weighting value is randomly set from among values of −1 to 1. On the contrary, if at operation 306 the optimal weighting value is obtained, at operation 310 the obtained optimal weighting value is set as an initial weighting value.

When at operations 308 and 310 the weighting value initialization has been completed, at operation 312, input data corresponding to the set variables and past history data related to carrying times in the real automatic warehouse system 202 are input to the virtual automatic warehouse system 204. More particularly, operation 312 uses actual history data for the variables set at operation 302, such as a number of operations in standby, usable capacity, the number of stacker cranes, a distance between carrying ports, a carrying type, an operation priority, etc. At operation 312, these past history data are applied to the weighting value set at operation 308 or 310, thereby providing input variable data to the virtual warehouse system 204. Further, operation 312 uses the history data of carrying times between ports in the actual automatic warehouse system 202 as desired output variable data. At operation 314, the virtual automatic warehouse system 204 calculates a predicted moving coefficient using the set optimal weighting value and the input data of the set variables and the past history, and calculates a predicted carrying time using the predicted moving coefficient.

At operation 316, an error $E_p$ between the calculated predicted carrying time and a real carrying time form the automatic warehouse system 202 is calculated. At operation 318, the error $E_p$ and a preset allowable range are compared with each other. The preset allowable range can provide a threshold based upon a tolerance or a maximal value of allowable range. If, at operation 318, the error $E_p$ is within the allowable range, the learning method of the virtual automatic warehouse system 204 is finished, and the learned contents are applied to control the real automatic warehouse system 202. On the other hand, if, at operation 318, the error $E_p$ is not within the allowable range, at operation 320 the weighting value previously set is corrected/adjusted. Typically, the weighting value is corrected/adjusted by correcting/adjusting the set variables of the virtual automatic warehouse system and obtaining another optimal weighting value according to operations 302–310. Then, the process returns to operation 312 for inputting data corresponding to the set variables and the past history data related to the moving time(s) so as to calculate a new predicted carrying time.

As described above, when past history data is input as input variable data into the virtual warehouse system 204, an error (difference) between output variable data of the virtual warehouse system 204 and desired output variable data can be obtained (for example, by a learning theory). If the error is above an allowable range, then the virtual warehouse system 204 produces a new weighting value and the virtual warehouse system 204 repeats operations 312 thorough 316 until the error is within the allowable range. When the error is within the allowable range, the virtual warehouse system 204 can set the weighting value used to calculate the predicted carrying time as an optimal weighting value. Therefore, as described above, the present invention provides a method of predicting a carrying time in a real automatic warehouse system, which is difficult to mathematically model because of presence of indefinite factors, by modeling a virtual automatic warehouse system to be approximate to the real automatic warehouse system based upon input and output variables (e.g., past carry times, a current carry time, and variables influencing a carrying time, etc.) of the real automatic warehouse system using a neural networks control theory, and finding an optimal carrying path in the real automatic warehouse system based upon the modeling result, thus allowing optimal logistics flow.

Typically, an automatic warehouse system is controlled by control commands from a logistics controller (for example, systems 102 and 104) to control carrying paths. In an aspect of the invention, an automatic warehouse system, in response to one of the carrying commands from the logistics controller, calculates a predicted (i.e., an optimal) carrying coefficient (a virtual moving coefficient) by modeling itself using one or more neural networks theories based upon carry-time-influencing variables and applies the predicted carrying coefficient to the logistics controller to control the automatic warehouse system in selecting an optimal carrying path for the carrying command. The predicted carrying coefficient is calculated by obtaining an optimal weighting value from the modeling of the automatic warehouse system, which applies the neural networks theories to the carry-time-influencing variables, and applying the obtained optimal weighting value to real input data corresponding to the carry-time-influencing variables and past history data related to carrying times, thereby allowing selection of an optimal carrying path. In particular, the predicted carrying coefficient is used to calculate a predicted carrying time, which can be used to select the optimal carrying path in the automatic warehouse system. Processes of the invention as an automatic warehouse system carrying-time-predictor and/or optimizer can be embodied in software and/or hardware and executed on any known computer system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims and their equivalents.

What is claimed is:

1. A method of controlling an automatic warehouse system in a logistics system, comprising:

setting input carry time variables of the automatic warehouse system in a virtual automatic warehouse system;

modeling the automatic warehouse system in the virtual automatic warehouse system based upon the set carry time variables;

setting an optimal weighting value according to the modeling;

calculating a predicted carrying time based upon the optimal weighting value, input data corresponding to the set carry time variables and past history data related to carrying times in the automatic warehouse system;

calculating an error between the predicted carrying time and a real carrying time in the automatic warehouse system; and selecting an optimal carrying path in the automatic warehouse system according to the predicted carrying time if the error is within a preset allowable range.

2. The method of controlling an automatic warehouse system in a logistics system according to claim 1, further comprising correcting the weighing value to recalculate the predicted carrying time if the error is not within the preset allowable range.

3. The method of controlling an automatic warehouse system in a logistics system according to claim 1, wherein a neural networks control theory is used to model the virtual automatic warehouse system.

4. The method of claim 1, wherein the error is calculated according to $$E_p = \sum_k (d_k - X_k)$$

where $d_k$ is the real carrying time, $X_k$ is the predicted carrying time and k is an index of output variable data.

5. A method of controlling an automatic warehouse system in a logistics system, comprising:

setting an optimal weighting value by applying a neural networks theory to carrying-time-influencing variables of the automatic warehouse system;

calculating a predicted carrying time based upon the optimal weighting value, input data of the carrying-time-influencing variables and past history data of carrying times; and selecting an optimal carrying path in the automatic warehouse system according to the predicted carrying time.

6. The method of claim 5, wherein the optimal carrying path is selected by determining if an error between the predicted carrying time and a real carrying time in the automatic warehouse system is within an allowable range and if the error is not within the allowable range, adjusting the carrying-time-influencing variables to reset the optimal weighting value and to recalculate the predicted carrying time.

* * * * *